United States Patent [19]
Grant

[11] Patent Number: 5,343,885
[45] Date of Patent: Sep. 6, 1994

[54] VACUUM AIR LOCK FOR A CLOSED PERIMETER SOLVENT CONSERVATION SYSTEM

[75] Inventor: David C. H. Grant, Selbyville, Del.

[73] Assignee: Baxter International Inc., Deerfield, Ill.

[21] Appl. No.: 845,689

[22] Filed: Mar. 4, 1992

[51] Int. Cl.[5] .............................................. B08B 3/10
[52] U.S. Cl. ................................... 134/105; 134/200; 134/201; 312/1
[58] Field of Search ................... 312/1; 134/200, 201, 134/105; 68/5 E, 18 R; 118/719

[56] References Cited

U.S. PATENT DOCUMENTS

| | | |
|---|---|---|
| 2,129,299 | 9/1938 | Bichowsky . |
| 3,501,213 | 3/1970 | Trexler ................................. 312/1 |
| 3,937,043 | 2/1976 | Hughes et al. ..................... 68/18 R |
| 4,048,007 | 9/1977 | Valle-Riestra . |
| 4,066,423 | 1/1978 | McGill et al. . |
| 4,261,707 | 4/1981 | Bradshaw et al. . |
| 4,265,642 | 5/1981 | Mir et al. . |
| 4,383,838 | 5/1983 | Barten et al. . |
| 4,528,001 | 7/1985 | Yokogawa et al. . |
| 4,558,524 | 12/1985 | Peck ..................................... 134/105 |
| 4,574,005 | 3/1986 | Cobbs, Jr. et al. . |
| 4,604,111 | 8/1986 | Natale .................................... 312/1 |
| 4,693,777 | 9/1987 | Hazano et al. ..................... 134/105 |
| 4,708,721 | 11/1987 | Ehrler . |
| 4,902,310 | 2/1990 | Vara et al. . |
| 4,902,934 | 2/1990 | Miyamura et al. ............. 118/719 X |
| 4,920,768 | 5/1990 | Cares et al. ......................... 312/1 X |
| 4,983,223 | 1/1991 | Gessner ............................... 134/105 |
| 5,010,907 | 4/1991 | Henson et al. ...................... 312/1 X |
| 5,147,108 | 9/1992 | Suma et al. ..................... 118/719 X |

FOREIGN PATENT DOCUMENTS

| | | |
|---|---|---|
| 3124388 | 2/1983 | Fed. Rep. of Germany . |
| 4030186 | 4/1991 | Fed. Rep. of Germany .......... 312/1 |
| 62-125619 | 6/1987 | Japan ................................... 134/902 |
| 2148841 | 6/1990 | Japan ................................... 134/902 |

Primary Examiner—Frankie L. Stinson
Attorney, Agent, or Firm—Charles R. Mattenson; Thomas S. Borecki; Philip G. Meyers

[57] ABSTRACT

A vacuum air lock assembly for transferring an article into an enclosure for treating the article with a solvent, the enclosure including a door for admitting the article into or out of the enclosure, the assembly including a chamber mounted on the enclosure and having an outer door, the chamber being sealed to the enclosure for transferring the article from the chamber through the enclosure door into the enclosure, a vacuum pump for drawing a vacuum in the chamber and discharging the air to atmosphere, the chamber being connected to the enclosure to break the vacuum in the chamber with solvent vapor from the enclosure, the article is transferred into the enclosure through the enclosure door for treatment and returned to the chamber after treatment, and the solvent vapor in the chamber is returned to the enclosure chamber through the vacuum pump and the vacuum in the chamber is broken to atmosphere.

26 Claims, 3 Drawing Sheets

VACUUM AIR LOCK FOR A CLOSED PERIMETER SOLVENT CONSERVATION SYSTEM

FIELD OF THE INVENTION

The present invention relates generally to an emission control system for minimizing the atmospheric introduction of volatile constituents from fluid compositions used to treat articles as part of or incident to a manufacturing procedure.

BACKGROUND OF THE INVENTION

U.S. Pat. No. 5,106,404, issued Apr.21, 1992, assigned to the same assignee, a system for minimizing the escape of volatile compositions to the atmosphere is described wherein an article to be treated is placed in a chamber capable of maintaining both pressure and an effective vacuum, evacuating the chamber to remove virtually all gases, introducing into the chamber a fluid composition comprised of volatile constituents such as a solvent for treating the article, recovering the fluid and vapor components of the solvent composition following the treatment step and subsequently removing residual liquid by flushing the chamber with a drying fluid. The drying fluid is derived from the residual charge of noncondensable gas and solvent vapor within a closed loop system. The chamber is evacuated and the chamber then opened to the atmosphere for removal of the article.

In a closed perimeter system of the type contemplated herein a vapor barrier or perimeter is used to form an enclosure around a solvent consuming process to thereby prevent solvent emission and air entry into the process. The closed perimeter system is applicable to cleaning/flushing, drying, coating, degreasing/defluxing solvent cooled machining, etc. It was early recognized that the secret to avoiding solvent emission is to prevent the solvent from coming into contact with air. If allowed to mix with air inevitably some solvent will be lost to the atmosphere.

Since pressure within the enclosure is maintained at essentially room pressure, the enclosure can be very lightweight and can be as simple as a frame covered with film or as complex as a sealed skin enclosure. There is flexibility as to where the enclosure is placed to make necessary operator or maintenance access easier.

At startup the enclosure is filled with air, as solvent vapor is added due to loss from the process, gas volume increases. The solvent vapor is passed through a stripper and the gas is stored in a pressure controlling accumulator. When the volume limit of the accumulator is reached, venting from the system occurs. Gas from the exit of the stripper, having the lowest solvent vapor concentration in the system, is vented. Recovery of this small vapor loss by a carbon absorber may be used, or the solvent vapor may be destroyed to prevent its emission to the atmosphere. Gas from the enclosure is circulated to the stripper and back to the enclosure, thus forming a closed loop of circulating gas. As solvent relative humidity (SRH) rises within the closed loop its dew point decreases. The solvent dew point decreases to the temperature of the stripper (about $-20°$ F.). Any further additional solvent added by the process to the circulating gas will result in condensation of solvent to maintain a constant 90% SRH at the discharge of the stripper.

The closed perimeter system, CPS, provides a practical and relatively low cost way to significantly reduce solvent emissions. When the CPS is applied to or retrofitted to an existing solvent process such as cleaning, little, if any, process development is needed since the process will run essentially the same after application of the enclosure as before. The closed perimeter system is tolerant of process deficiencies within the enclosure. Load slugs are no problem and in some cases increase production through put and decreased solvent emission are available simultaneously. However, solvent emission from the closed loop and air entry into the closed loop does occur on introduction and removal of the article from the enclosure.

SUMMARY OF THE PRESENT INVENTION

The present invention relates to an air lock assembly which in combination with the closed perimeter system provides a system for introducing a product into and removal of the product from the closed perimeter enclosure without introducing air or allowing solvent vapor to escape. The air lock assembly provides a basic vacuum to vacuum process for introducing and removing a product from the closed perimeter enclosure. The air lock assembly generally includes a chamber and a vacuum pump. The chamber being connected to the enclosure and to the vacuum pump.

The process includes the steps of isolating the air lock chamber from the rest of the closed perimeter system. Opening the chamber to introduce the product, closing the chamber, removing the air from the chamber by a vacuum pump, discharging the air from the vacuum pump outside the system, breaking the vacuum in the chamber with gas from inside the enclosure, opening the enclosure door and moving the product into the enclosure, processing the product, replacing the product in the air lock chamber, closing the enclosure door to isolate the chamber from the enclosure, evacuating the chamber air by the vacuum pump and discharging the chamber air back to the enclosure, breaking the vacuum in the chamber with air from the room and opening the air lock chamber door to remove the product.

The advantage of applying the air lock to the closed perimeter system is that the product can be put into and removed from the closed perimeter system without introducing air into the system or allowing solvent vapor to escape from the system. The closed perimeter system in combination with the vacuum air lock assembly makes it possible to retrofit existing open type vapor degreasers with a low cost easy to install effective retrofit package and to reduce solvent emissions by more than 99%.

Other principal features and advantages of the invention will become apparent to those skilled in the art upon review of the following drawings, the detailed description and the appended claims.

Figure 1:
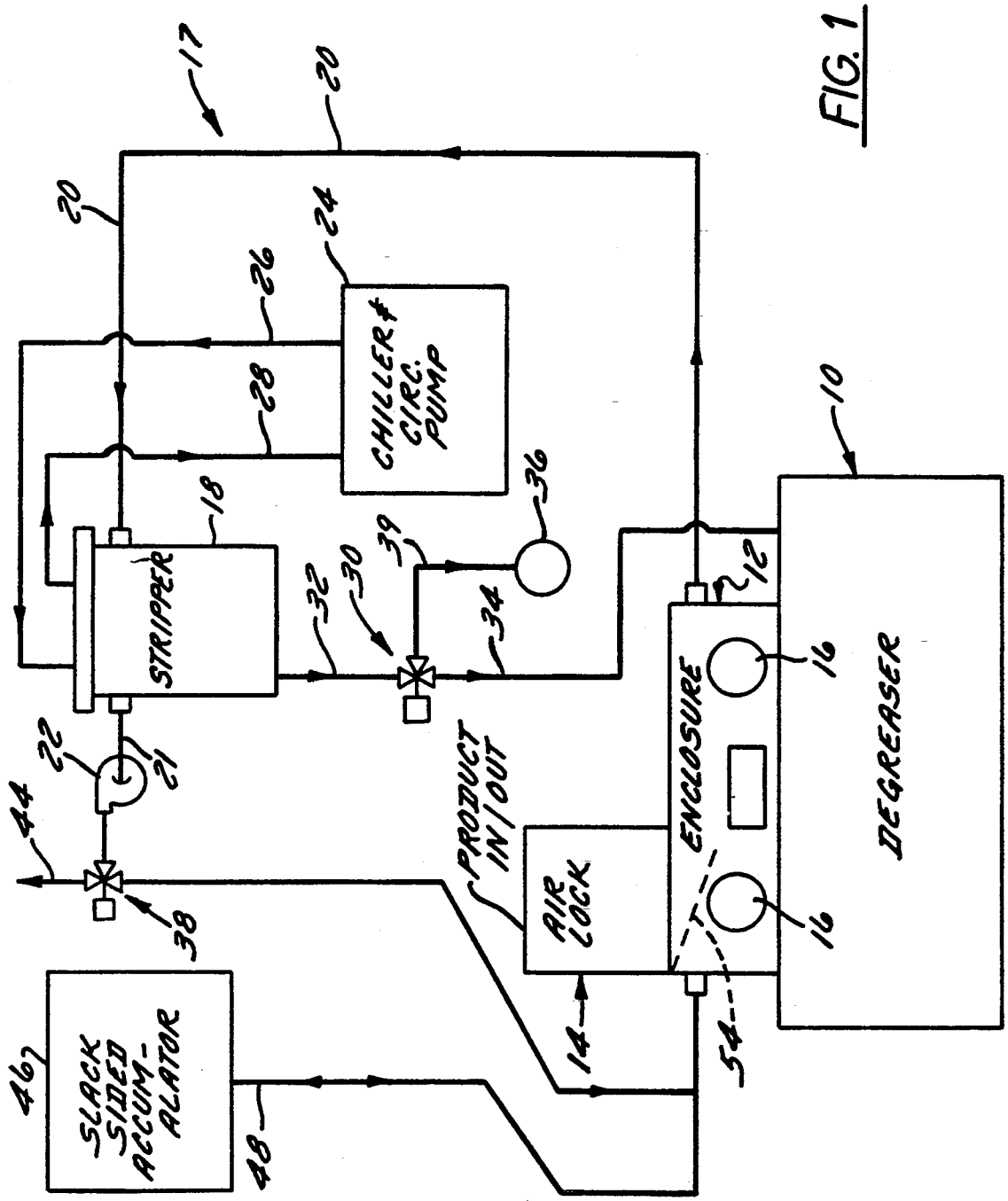
FIG. 1 is a schematic diagram of a closed perimeter system with the air lock chamber mounted thereto.
Figure 2:
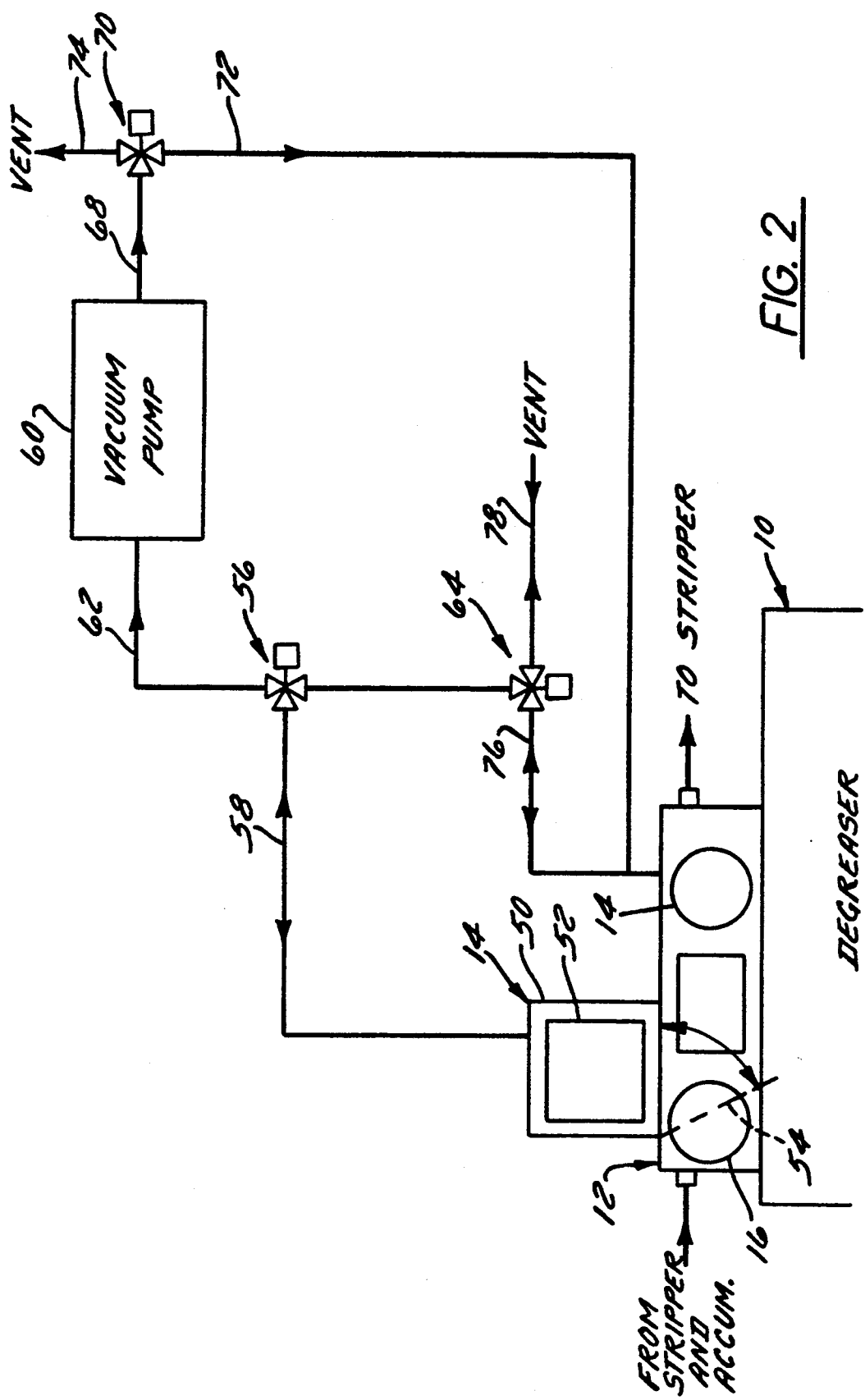
FIG. 2 is a schematic diagram of the air lock chamber shown connected to the vacuum system.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The present invention relates generally to a process for cleaning a product with a solvent vapor either in a continuous or a batch process. The practical application of the closed perimeter system depends on the configuration of the type of process. The closed perimeter system includes an enclosure 12 which is used to keep solvent vapor inside the system during a cleaning process and a closed loop 17 which recirculates the solvent vapor back to the enclosure. The closed loop 17 consists of the following components in order of circulation: a degreaser 10 which is the source of solvent vapor, the enclosure 12 which is sealed to the degreaser, conduit 20 connecting the enclosure to a stripper 18, conduit 21 connecting the stripper 18 to a circulating blower 22, conduit 40 connecting the blower 22 to a venting valve 38 and conduit 42 connecting the venting valve 38 to a conduit 48 which connects an accumulator 46 to an enclosure 12. Since pressure within the closed loop 17 is maintained at essentially room pressure, the enclosure 12 can be very lightweight. It can be as simple as a frame covered with film or as complex as a sealed skin enclosure.

The concentration of solvent vapor in the air contained within the closed loop 17 at startup will rise as solvent vapor is lost from the process. The vapor stripper 18 is used to maintain the "solvent relative humidity" (SRH) at a low level. If SRH is controlled at 20% within the enclosure 12, the drying performance of the process functions much as it did before the enclosure was installed. In many cases the recovered distilled solvent liquid from the stripper 18 may be recycled through conduit 32, valve 30 and conduit 34, back to the enclosure 12 without additional processing. Liquid solvent can also be directed by valve 30 and conduit 39 to reservoir 36.

Of the several types of strippers 18 direct temperature swing recovery is recommended. The stripper is small, relatively inexpensive and easy to operate. Gas recirculation rate is low. Low solvent relative humidity (SRH) gas returning to the enclosure with or without added heat may be used to enhance product drying. Water within the closed loop 17 is captured in the stripper as ice and is removed in a defrost cycle. The volume of gas within the closed loop 17 will increase during startup as solvent vapor is added to the air within the closed loop 17. Once SRH equilibrium is reached the volume of the gas will be essentially constant for a continuous process or will swing through a small range for a cyclical process. The air within the closed loop 17 is used to transport solvent vapor to the stripper 18 for recovery. It transports the solvent vapor but does not allow the solvent to pass outside the enclosure.

The slack sided accumulator 46 is used to accommodate gas volume swings, maintain internal pressure in the closed loop 17 at room level and with instrumentation to control venting. Venting may be necessary to expel excess air on startup and to accommodate the ingestion of air during operation, e.g., air entering with the product. Air at the exit of blower 22, with the lowest vapor concentration in the closed loop, is vented through valve 38 and conduit 44.

In accordance with the present invention an air lock system 14 is added to the enclosure 12. The air lock system 14 is used to transfer the product into and out of the enclosure 12 without entry of air or loss of solvent vapor. The design of the air lock system will vary depending on the product. An air lock system for a web product is relatively simple. An air lock system for baskets may be manual or automated and needs careful attention. An air lock system for an in line defluxer, processing several different circuit boards, is more sophisticated.

A representative closed perimeter system 12 as shown in FIG. 1 generally includes a commercial degreaser 10 having an enclosure 12 mounted thereon. The degreaser 10 is a standard system with the enclosure 12 sealed to the top of the commercial degreaser. The enclosure 12 provides the vapor barrier. The enclosure 12 may include hand holes 16 for performing the cleaning function. A vapor stripper 18 is connected to the enclosure 12 by a tube or pipe 20. A chiller and circulating pump assembly 24 is connected to the stripper 18 by pipes or tubes 26 and 28. The exit of stripper 18 is connected by tube or pipe 21 to blower 22 which draws solvent vapor from enclosure 12 through stripper 18 where excess solvent is condensed and the low SRH gas enters blower 22. The blower 22 runs continuously. The stripper 18 is connected to a two way valve 30 by a pipe 32. The two way valve 30 is connected to the degreaser 10 by a tube 34 or to a storage tank 36 by a tube 39. Solvent collected in the stripper 18 may be returned to the degreaser 10 through the valve 30 or to the solvent storage tank 36 through tube 39. The blower 22 is connected to a three way valve 38 by a tube 40. The valve 38 is connected to the enclosure 12 by a tube 42 or vented to atmosphere through a tube 44. Low solvent humidity gas from the stripper 18 may be returned to the enclosure 12 or vented to atmosphere through valve 38. A slack sided accumulator 46 is connected to the enclosure 12 by a tube 48. The accumulator 46 is used to accommodate gas volume swings to maintain the internal pressure which the enclosure at room level and, with instrumentation, to control venting. Venting may be necessary to expel excess air on startup and to accommodate the ingestion of air during operation. The air with the lowest vapor concentration is vented through valve 38 as noted above.

The air lock system 14 includes an air lock chamber 50 having an access door 52. A transfer door 54 is provided on the enclosure for opening the enclosure to chamber 50. The chamber 50 is connected to a three way valve 56 by a tube 58. The valve 56 is connected to a vacuum pump 60 by a tube 62 and to a second three way valve 64 by a tube 66. The vacuum pump 60 is connected to a three way valve 70 by a tube 68. The valve 70 is connected to the enclosure by a tube 72 and vented to atmosphere by tube 74. The valve 64 is connected to the enclosure 12 by a tube 76 and vented to atmosphere by a tube 78.

At startup the enclosure 12 is filled with air. As solvent vapor accumulates in the enclosure 12 during the processing of the article, the enclosure 12 is vented to the slack sided accumulator 46 through tube 48. When the volume limit of the accumulator 46 is reached, gas from the exit of the stripper 18 which has the lowest solvent concentration of the system is vented through blower 22 and valve 38 to tube 44. This small vapor loss may be recovered by a carbon absorber provided at the end of tube 44 or may be destroyed by chemical, thermal or other processes.

Gas from the enclosure 12 is circulated to the stripper 18 by the circulation blower 22. As the solvent relative humidity within the closed loop 17 rises, it will reach a level where the solvent dew point is reduced to the temperature of the stripper heat exchanger (−20° F.). Further addition of solvent vapor will result in condensation of solvent in the stripper 18 to maintain a constant 9% relative humidity at the discharge of the stripper. This will produce a solvent relative humidity within the enclosure chamber 12 of 10%–20% in a fully loaded machine. During idle solvent relative humidity in the enclosure 12 is reduced by vapor recovery from full load level of about 20% to idle level of 9%–10%. Recovered solvent of distilled solvent quality may be returned directly to the degreaser through line 34. At shut down solvent gas stored in the accumulator 46 is returned to the enclosure 12.

In accordance with the invention the air lock system 14 provides the means to access the enclosure 12 without release of solvent to the atmosphere. The air lock chamber 50 shown is one of many possible configurations that may be applied to a closed barrier system for exiting or new open type vapor degreasers or other solvent processing systems.

In operation a basic vacuum to vacuum process is utilized. This involves isolating the air lock chamber 50 from the rest of the closed solvent processing system. An access door 52 is opened and the product to be cleaned is introduced into the chamber 50. The access door 52 is closed, valve 56 is opened and the air evacuated from the chamber by the vacuum pump 60. The air from the vacuum pump is vented to atmosphere through the valve 70 and tube 74. When the air chamber 50 has been completely evacuated, the vacuum pump 60 is turned off, valve 56 is closed to the vacuum pump 60, and opened to the valve 64 which is opened to the closed loop 17 through tube 76. The vacuum in the air lock chamber 50 draws gas from inside the closed loop 17 so that the air lock chamber 50 is of the same air/solvent/vapor composition as inside the enclosure chamber 19.

The transfer door 54 is opened to transfer the product to the enclosure 12 for degreasing. After degreasing the product is replaced in the air lock chamber 50 and the transfer door 54 closed to isolate the air lock chamber 54 from the enclosure 12. The air lock chamber 50 is again evacuated by the vacuum pump 60 and the contents discharged through the valve 70 back to the closed loop 17 through pipe 72. The vacuum in the air lock chamber 50 is broken by opening valves 56 and 64 to return the air lock chamber 50 to room pressure. The access door 52 is then opened to remove the product.

Figure 3:
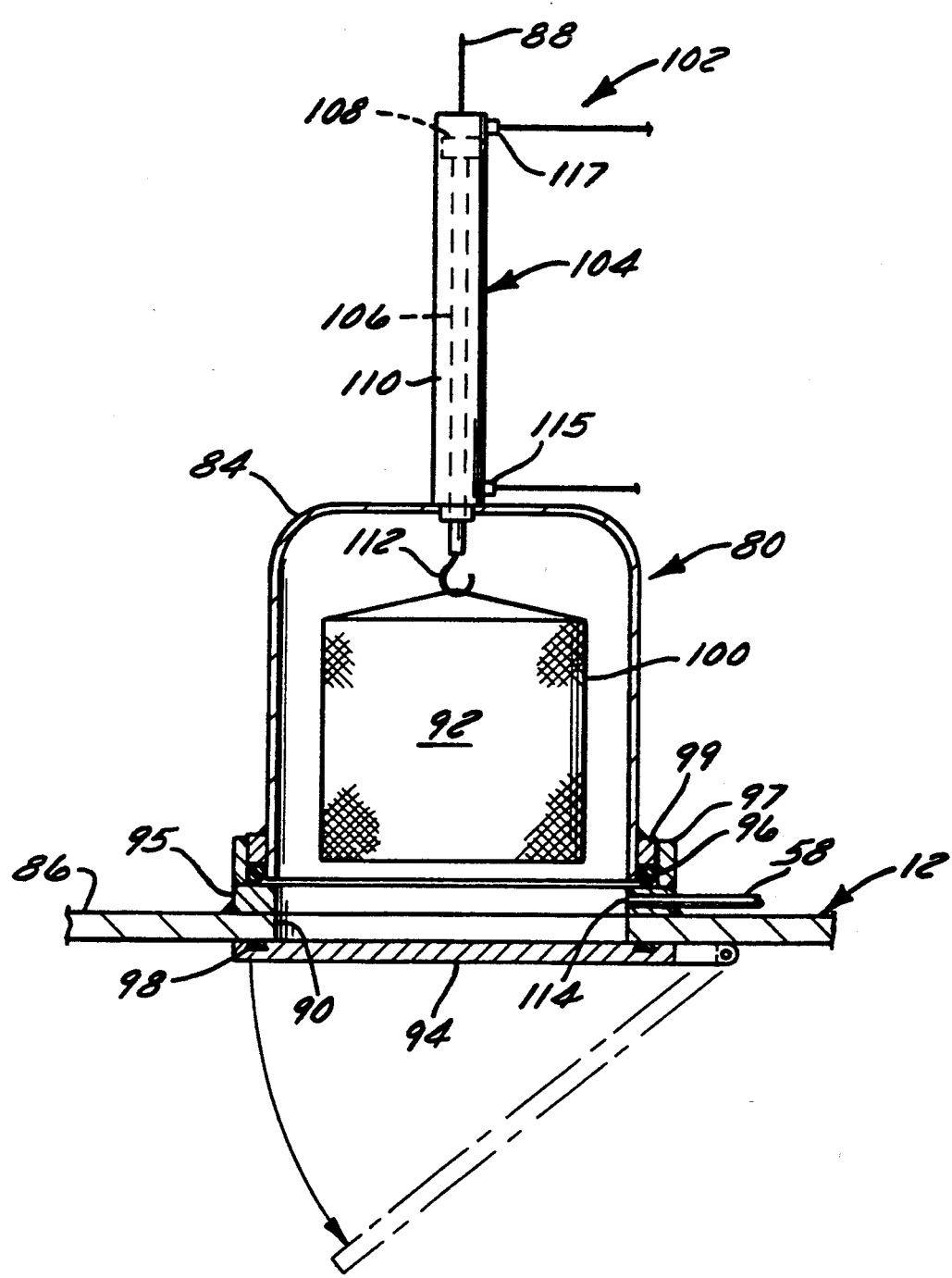
FIG. 3 is a schematic view of another form of air lock assembly.

Referring to FIG. 3 an alternate embodiment of the air lock system 80 is shown which can be used with a manually operated open top type degreaser. The air lock system 80 includes a housing or bell 84 which is suspended above the top 86 of the enclosure 12 by means of a rope or cable assembly 88. An opening 90 is provided in the top 86 of the degreaser enclosure 12 through which the product 92 to be cleaned is inserted or removed from the enclosure 12 and degreaser 10. The housing or bell 84 is open at the bottom and has an outer circumference larger than the opening 90 in the top 86 of the enclosure 12. A door 94 is pivotally mounted on the inside of the top 86 to open and close the opening 90. Means are provided around the perimeter of the door opening 90 to hermetically seal the housing or bell to the top of the degreaser.

In this regard, an adapter ring 95 is mounted on the top of the enclosure around opening 90 and secured thereto by any appropriate means. The ring 95 is also sealed to the top of the enclosure 12. A containment ring 97 is mounted on the outer edge of the top of the adapter ring 95 and an 0-ring seal 96 is positioned on the top of the adapter ring 95 inside of the containment ring 97. The 0-ring seal 96 is retained in place by a spacer ring 99 mounted on the outside of the bell 84 which is guided into position on the adapter ring 95 by the containment ring 97 and sealed therein by 0-ring 96. The door 94 is sealed to the inside of the top of the enclosure by means of a gasket 98 secured to the inside of the top of the enclosure.

The product 92 to be cleaned is supported in a basket 100 suspended in the housing or bell by a hook assembly 102. In this regard, hook assembly 102 includes a double acting piston and cylinder assembly 104 having a cylinder 106 mounted on the top of housing 84. A piston 108 is provided in the cylinder 106 and includes a rod 110 which depends from the cylinder 106 into the housing 84. A hook 112 is connected to the end of the rod 110 for supporting the basket 100 in which the product 92 to be cleaned is placed.

In operation, the housing or bell 84 is suspended above the enclosure with the piston rod 110 extended downwardly below the housing 84. The product or products to be cleaned are placed in the basket 100 and the basket 100 attached to the hook 112. Air is introduced into the lower end 115 of the cylinder 100 to raise the piston rod 110 into the cylinder and the basket into the housing or bell 84. The housing or bell 84 is pulled down to seat the bell 84 on the seal 96 in the top of the enclosure and the door 94 closed against gasket 98. The air is evacuated from the bell 84 through an opening 114 in the adapter ring 94 which is connected by tube 58 to the vacuum pump 60 for discharge to atmosphere as described above. The vacuum in bell 84 is broken by opening valves 64 and 56 to fill the bell with solvent vapor from the closed loop 17. The door 94 is opened and the piston and cylinder assembly 102 actuated by introducing air into the upper end 117 of the cylinder to lower the basket into the degreaser. After the product has been cleaned, the product is placed in the basket 100 which is then mounted on the hook 112. The piston and cylinder assembly is reversed to lift the basket 100 into the bell 84. The door is closed and the valve 56 opened to pump 60 to draw the solvent gas from the bell 84 and return it to the closed loop 17 through valve 70 and tube 72. The vacuum in bell 84 is broken by opening valves 56 and 64 to the atmosphere. The bell 84 is then lifted off the adapter ring 95 and the basket 102 lowered to remove the solvent cleaned product.

Thus, it should be apparent that there has been provided in accordance with the present invention a vacuum air lock for a closed perimeter solvent conservation system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An apparatus for introducing and removing an article into and out of an enclosure for processing with a liquid containing volatile constituents, comprising:

an enclosed air lock chamber operatively connected to the enclosure, the air lock chamber including an outer door for admitting the article into the chamber and an inner door through which the article can be transferred from the chamber into and out of the enclosure; and a vacuum pump system connected to the air lock chamber that evacuates air from the chamber to the atmosphere prior to transferring an article to be processed into the enclosure, and that evacuates vapor of the liquid from the chamber prior to unloading the article for processing and returns the vapor to the enclosure; and means for sealing the air lock chamber when the inner and outer doors are closed so that a vacuum is created in the air lock chamber during operation of the vacuum pump.

2. The apparatus of claim 1, further comprising a valve system that admits vapor of the liquid into the chamber prior to opening the inner door to transfer the article into the enclosure, and admits air into the chamber prior to opening the outer door to transfer the article out of the apparatus.

3. The apparatus of claim 1, wherein the vacuum pump system further includes a closed loop connecting the chamber to the enclosure separately from the inner door, the closed loop including a vacuum pump and a first valve downstream from the vacuum pump which, in a first position, vents air withdrawn from the chamber by the vacuum pump to the atmosphere, and in a second position, routes vapors withdrawn from the chamber by the vacuum pump to the enclosure.

4. The apparatus of claim 2, wherein the vacuum pump system further includes a second valve upstream from the vacuum pump, a bypass loop connecting the second valve to the enclosure, and a third valve in the bypass loop between the second valve and the enclosure, wherein the second valve, in a first position, permits air to flow from the chamber to the vacuum pump, and in a second position, opens the chamber to the bypass loop, and wherein the third valve, in a first position, opens the bypass loop leading to the second valve to outside air and, in a second position, establishes communication between the second valve and the enclosure, whereby, when the second valve is in its second position and the third valve is its first position, air can be admitted to the chamber prior to removal of the article from the airlock, and when the second valve is in its second position and the third valve is its second position, vapors from the enclosure may flow into the chamber prior to introduction of the article into the enclosure.

5. The system according to claim 4, wherein the closed loop comprises tubes connecting the chamber to the vacuum pump, the vacuum pump to the first valve, and the first valve to the enclosure, and the bypass loop includes tubes connecting the second valve to the third valve, and the third valve to the enclosure.

6. The system according to claim 3, wherein the closed loop comprises tubes connecting the chamber to the vacuum pump, the vacuum pump to the first valve, and the first valve to the enclosure.

7. An apparatus for introducing and removing an article into and out of an enclosure for processing with a liquid containing volatile constituents, comprising:

an air lock chamber operatively connected to the enclosure, the air lock chamber including an outer door for admitting the article into the chamber and an inner door through which the article can be transferred from the chamber into and out of the enclosure;

a pump system connected to the air lock chamber that removes vapor of the liquid from the chamber prior to unloading the article for processing; and a closed loop liquid recovery system connected at opposite ends thereof to the enclosure that maintains the relative humidity of the liquid within the enclosure at a predetermined level.

8. A solvent conservation system for use with a cleaning device wherein articles are treated with a solvent, comprising:

an enclosure configured to cover an access opening of the cleaning device and prevent escape of solvent vapor therefrom;

an enclosed air lock having an internal air lock chamber and at least one opening that permits loading and unloading of the chamber with an article;

a door that seals the access opening of the enclosure when closed, and permits loading and unloading of the enclosure when open, the air lock then being closed to the outside;

a vacuum pump system that evacuates air from the air lock chamber when an article has been loaded therein from outside the system, and that evacuates solvent vapor from the air lock chamber when a treated article has been loaded therein from the enclosure;

means for sealing the air lock chamber when the door is closed so that a vacuum is created in the air lock chamber during operation of the vacuum pump; and a solvent recovery system that condenses solvent vapor evacuated from the air lock chamber.

9. The solvent conservation system of claim 8, wherein the solvent recovery system includes a valve for releasing excess air to the atmosphere as needed to relieve gas pressure within the closed loop solvent recovery system.

10. The solvent conservation system of claim 8, wherein the solvent recovery system includes an accumulator that accommodates gas build-up in the solvent conservation system.

11. The solvent conservation system of claim 8, wherein the solvent recovery system comprises a closed loop connected at opposite ends thereof to the enclosure, the closed loop including a stripper that condenses solvent from solvent vapor.

12. The solvent conservation system of claim 11, wherein the closed loop further includes a blower that circulates gas from the enclosure through the stripper and back to the enclosure.

13. The solvent conservation system of claim 12, wherein the closed loop further includes a slack-sided accumulator that expands to accommodate gas build-up in the closed loop, and a valve for releasing excess air to the atmosphere as needed to relieve gas pressure within the closed loop.

14. The solvent conservation system of claim 13, wherein the valve for releasing excess air to the atmosphere is located downstream from the stripper.

15. The solvent conservation system of claim 11, wherein the solvent recovery system further comprises a tube that returns condensed solvent to the enclosure.

16. The solvent conservation system of claim 8, wherein the air lock includes a second opening which opens to the outside of the system, and an outer door for sealing off the second opening, so that an article may be loaded into the air lock chamber when the outer door is open and the door to the enclosure is closed.

17. The solvent conservation system of claim 8, wherein the air lock further comprises:
- a bell having an opening that permits loading and unloading of the bell with an article from outside the system when the bell is removed from the enclosure, and that permits loading and unloading of the bell when the air lock is positioned over the access opening in the enclosure;
- a device that supports the article to be cleaned inside the bell; and
- a seal that is interposed between the bell and the enclosure when the air lock is positioned over the access opening in the enclosure, which seal prevents emission of solvent vapors.

18. The solvent conservation system of claim 17, wherein the air lock further comprises an adapter disposed about the access opening of the enclosure outside of the door, such that the seal engages the adapter, and the adapter has an opening therein connected to the vacuum system for evacuating the bell when the bell is positioned over the access opening in the enclosure and the door is closed.

19. The solvent conservation system of claim 18, wherein the adapter has means for positioning the bell over the access opening in the enclosure.

20. A portable air lock for transferring a article into and out of a solvent cleaning enclosure, which enclosure has an access opening, comprising:
- a bell having an opening that permits loading and unloading of the bell with an article from outside the system when the air lock is removed from the enclosure, and that permits loading and unloading of the bell when the air lock is positioned over the access opening in the enclosure;
- a support device that carries the article to be cleaned inside the bell;
- a seal interposed between the bell and the enclosure about the periphery of the enclosure access opening when the air lock is positioned over the access opening, which seal prevents emission of solvent vapors; and
- a device that operates within the bell to load and unload the support device carrying the article to and from the enclosure.

21. The portable air lock of claim 20, wherein the seal is mounted on the bell about the periphery of the opening in the bell.

22. The portable air lock of claim 20, wherein the bell further comprises a spacer disposed above and in proximity to the seal outside of the bell, which spacer is configured to fit closely within a containment ring mounted about the periphery of the access opening in the enclosure.

23. The portable air lock of claim 20, wherein the device that supports the article comprises a removable basket sized to fit through the bell opening, and the device that loads and unloads the article from the enclosure comprises a hydraulic cylinder having a fixture at an inner end thereof for removably supporting the basket, which basket is inserted into the enclosure upon actuation of the hydraulic cylinder.

24. The portable air lock of claim 20, wherein the device that supports the article comprises a removable basket sized to fit within the bell opening.

25. The portable air lock of claim 24, further comprising means for removably supporting the basket within the bell.

26. The portable air lock of claim 20, further comprising a cable attached to the bell for lowering the bell onto the opening in the enclosure.

* * * * *